US009967044B1

(12) United States Patent
Gray

(10) Patent No.: US 9,967,044 B1
(45) Date of Patent: May 8, 2018

(54) PORTABLE MUSIC STUDIO

(71) Applicant: Duwayne Morris Gray, Riviera Beach, FL (US)

(72) Inventor: Duwayne Morris Gray, Riviera Beach, FL (US)

( * ) Notice: Subject to any disclaimer, the term of this patent is extended or adjusted under 35 U.S.C. 154(b) by 0 days. days.

(21) Appl. No.: 15/413,490

(22) Filed: Jan. 24, 2017

Related U.S. Application Data

(60) Provisional application No. 62/366,116, filed on Jul. 25, 2016.

(51) Int. Cl.

| | |
|---|---|
| ***H03G 3/00*** | (2006.01) |
| ***H04H 60/05*** | (2008.01) |
| ***G06F 3/16*** | (2006.01) |
| ***G11B 20/10*** | (2006.01) |
| ***G10H 1/00*** | (2006.01) |

(52) U.S. Cl.
CPC ............ *H04H 60/05* (2013.01); *G06F 3/162* (2013.01); *G10H 1/0008* (2013.01); *G11B 20/10527* (2013.01); *G06F 3/165* (2013.01); *G10H 2240/285* (2013.01); *G10H 2240/311* (2013.01); *G11B 2020/10555* (2013.01); *G11B 2020/10574* (2013.01); *G11B 2020/10583* (2013.01)

(58) Field of Classification Search
CPC .............. H04R 29/00; H04R 2205/041; H04R 2430/01; H04R 2430/03; H04R 2499/13; H04R 25/43; H04R 25/552; H04R 29/002; H04R 29/008; H04R 3/00; H04R 3/005; H04R 5/02; H04R 5/033; H04R 1/02; H04R 1/30; H04R 1/342; H04S 5/00; H04S 1/002; H04S 2400/11; H04S 3/002; H04S 1/005; H04S 2400/05; H04S 2400/13; H04S 2420/01; H04S 2420/07; H04S 3/004; H04S 5/005; H04S 7/301; H04S 7/303; H04S 1/007
USPC ...... 381/104–109, 61, 66, 119; 84/600, 622, 84/625; 700/94
See application file for complete search history.

(56) References Cited

U.S. PATENT DOCUMENTS 3,560,000 A 2/1971 Beisner
D325,383 S 4/1992 Ito
5,524,060 A * 6/1996 Silfvast .................... H03G 3/00 381/104
5,792,971 A * 8/1998 Timis ................... G10H 1/0008 369/83

(Continued)

FOREIGN PATENT DOCUMENTS

WO 2005076907 A2 8/2005

*Primary Examiner* — Lun-See Lao
(74) *Attorney, Agent, or Firm* — Kyle A. Fletcher, Esq.

(57) ABSTRACT

The portable music studio is a modular apparatus that records and mixes music in real time. The portable music studio comprises a dock and a controller. The dock is a switching device that receives a first set of one or more audio signals from a first set of one or more audio sources and routes the each of the received audio signals as a first multichannel audio signal to the controller. The controller is a logic device that independently records each channel of the multichannel signal and directly receives and records a second set of one or more audio sources. The controller mixes this plurality of recorded audio sources. The portable music studio further generates musical audio input directly from the controller. The controller is separable from the dock to allow for recording, mixing and making audio files at a remote location.

10 Claims, 5 Drawing Sheets

(56) References Cited

U.S. PATENT DOCUMENTS

| | | | | |
|---|---|---|---|---|
| 6,263,154 | B1 | 7/2001 | Scheffler | |
| 7,262,358 | B2 | 8/2007 | Lubbers | |
| 7,421,084 | B2 * | 9/2008 | Jubien | G06F 3/16<br>381/119 |
| 2004/0143349 | A1 | 7/2004 | Robert | |
| 2008/0156179 | A1 | 7/2008 | Eastman | |
| 2008/0289478 | A1 | 11/2008 | Vella | |
| 2011/0112913 | A1 | 5/2011 | Murray | |
| 2016/0266867 | A1 * | 9/2016 | Olesh | G06F 3/165 |

* cited by examiner

PORTABLE MUSIC STUDIO

CROSS REFERENCES TO RELATED APPLICATIONS

This non-provisional application claims priority under 35 USC 119(e) to United States provisional application U.S. 62/366,116 filed on Jul. 25, 2016.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of musical instruments including electrophonic musical instruments, more specifically, an accessory configured for use in recording and combining audio signals produced by one or more musical instruments.

SUMMARY OF INVENTION

The portable music studio is configured for use with music and musical instruments. The portable music studio is a modular apparatus that records and mixes music in real time. The portable music studio comprises a dock and a controller. The dock is a switching device that: 1) receives a first set of one or more audio signals from a first set of one or more audio sources; 2) routes each of the received audio signals as a first multichannel audio signal to the controller; 3) receives an audio data stream from the controller; and 4) permanently records the received audio data stream to an electronic storage device. The controller is a device that: 1) receives a second set of one or more audio signals from a second set of one or more audio sources; 2) receives the first multichannel audio signal from the dock; 3) records each audio signal received through the second set of one or more audio signals as an independent audio file; 4) records each channel contained within the first multichannel audio signal as an independent audio file; 5) manipulates the volume of each of the recorded independent files; 6) manipulates the time index of any first recorded independent file relative to any second recorded independent file; 7) combines one or more recorded independent audio files into a single combined audio file; and, 8) transmits the single combined audio file to the dock for permanent recordation. The portable music studio further provides the ability to generate musical audio input directly from the controller. The controller is separable from the dock such that the controller can be used for recording, mixing and making audio files at a remote location.

These together with additional objects, features and advantages of the portable music studio will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable music studio in detail, it is to be understood that the portable music studio is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable music studio.

It is therefore important that the claims be regarded as including such equivalent construction insofar as they do not depart from the spirit and scope of the portable music studio. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
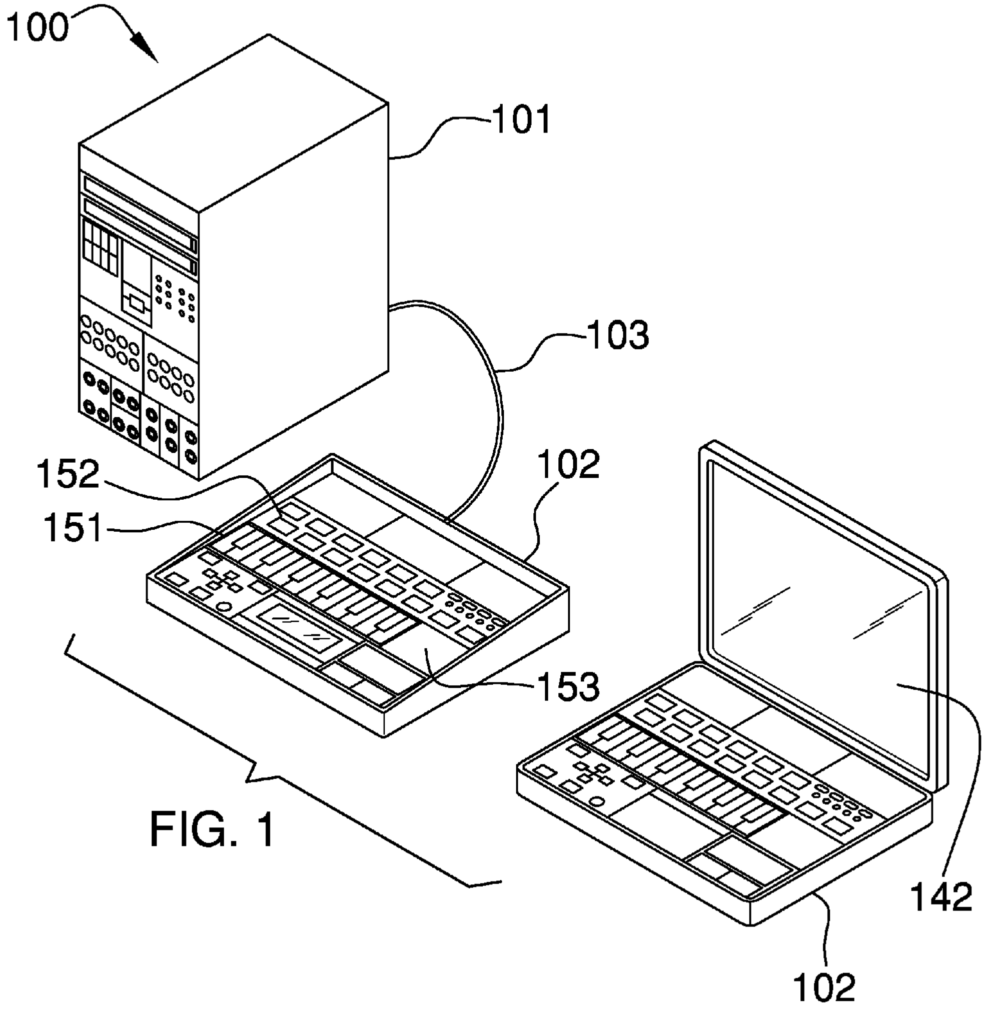
FIG. 1 is a perspective view of an embodiment of the disclosure.
Figure 2:
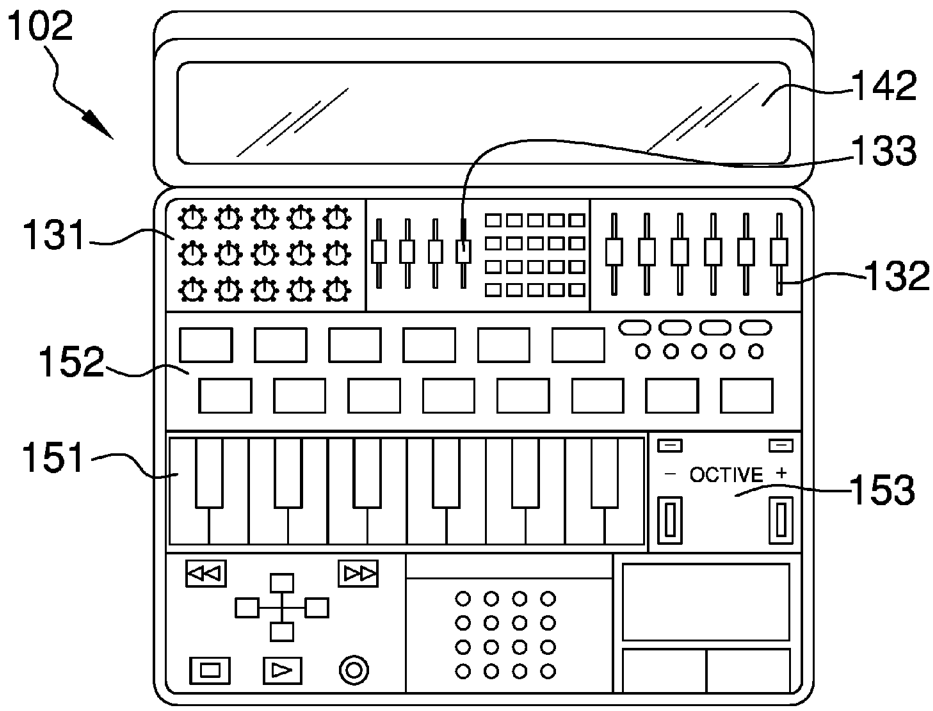
FIG. 2 is a top detail view of an embodiment of the disclosure.
Figure 3:
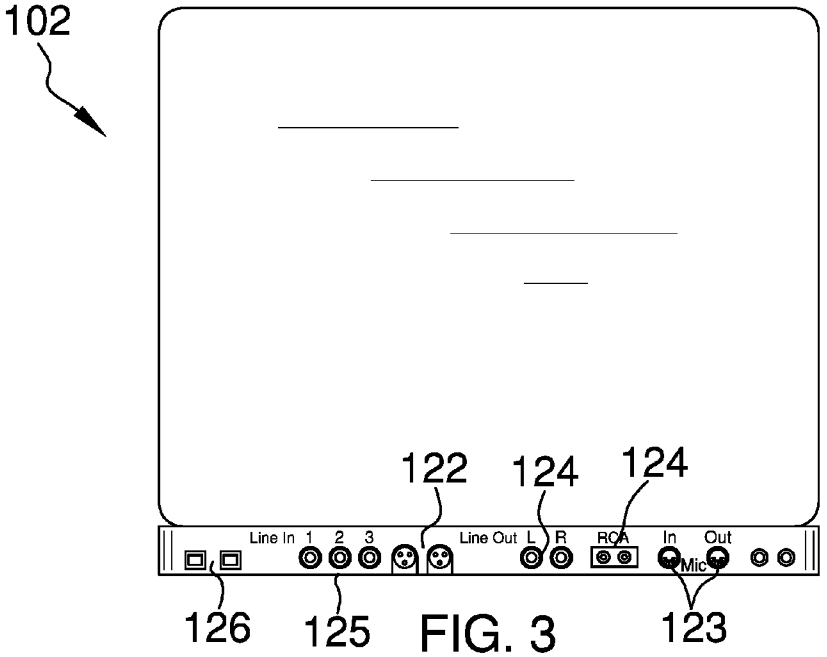
FIG. 3 is a rear detail view of an embodiment of the disclosure.
Figure 4:
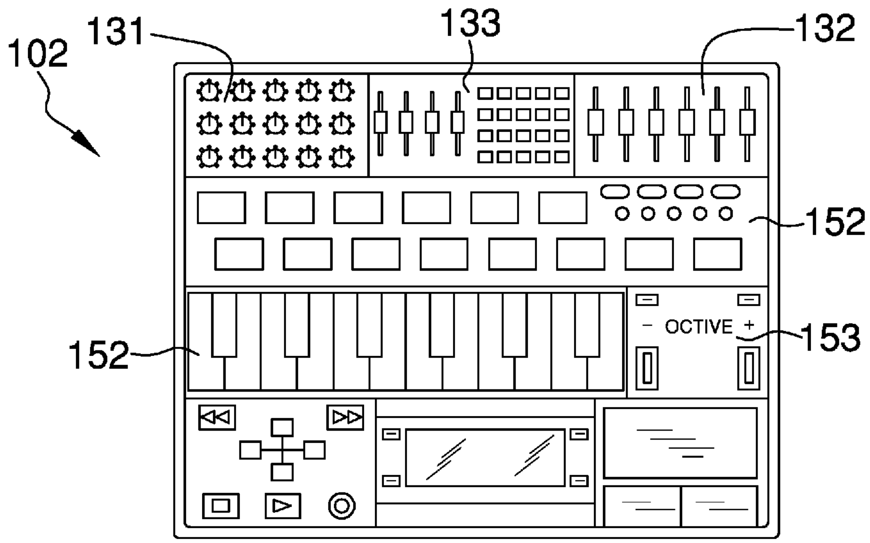
FIG. 4 is a top detail view of an embodiment of the disclosure.
Figure 5:
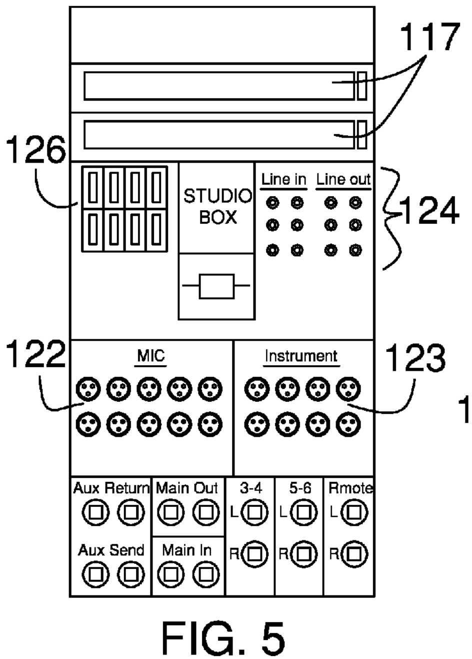
FIG. 5 is a front detail view of an embodiment of the disclosure.
Figure 6:
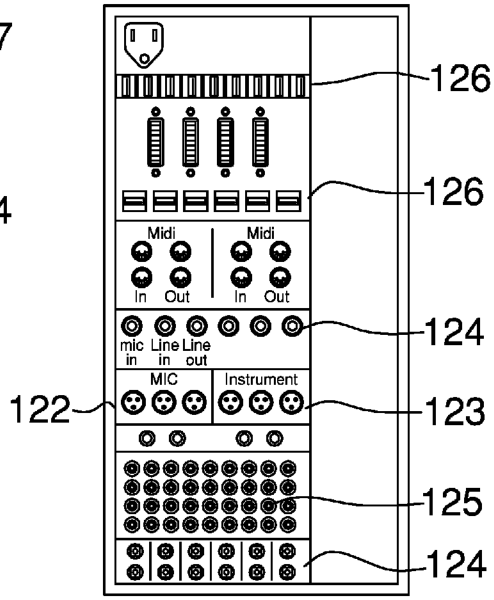
FIG. 6 is a rear detail view of an embodiment of the disclosure.
Figure 7:
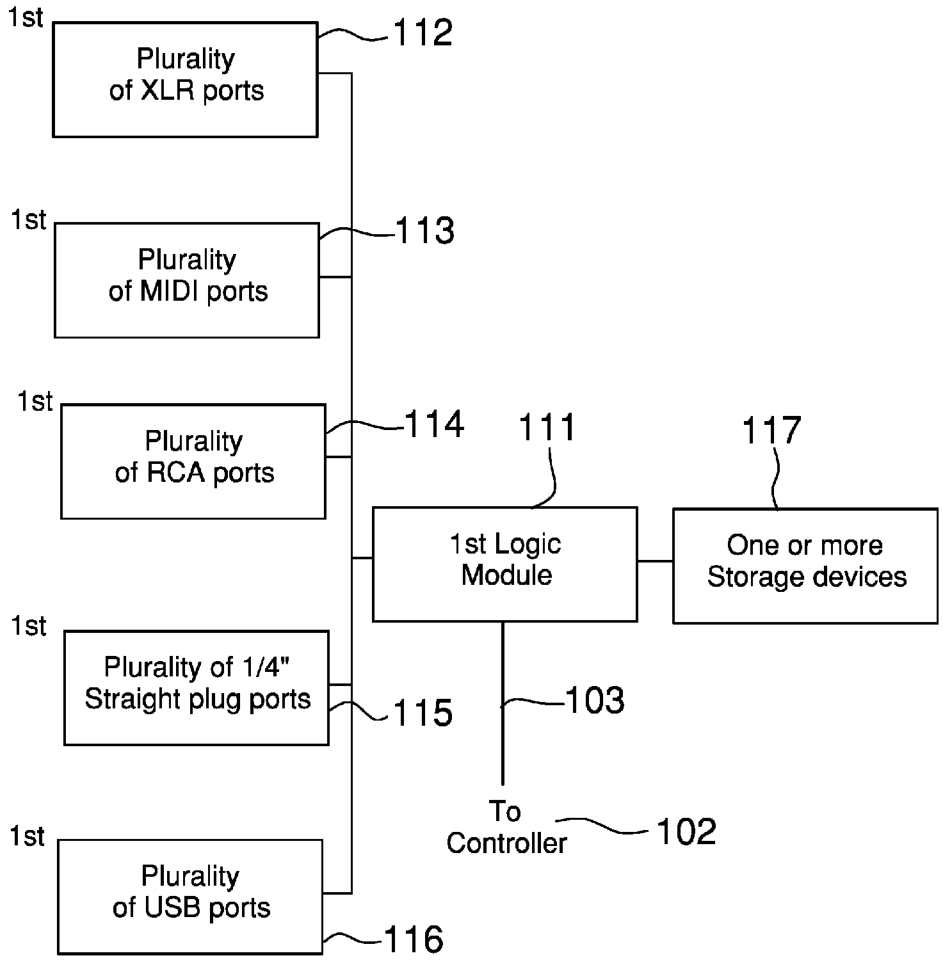
FIG. 7 is a block diagram of a detail of an embodiment of the disclosure.
Figure 8:
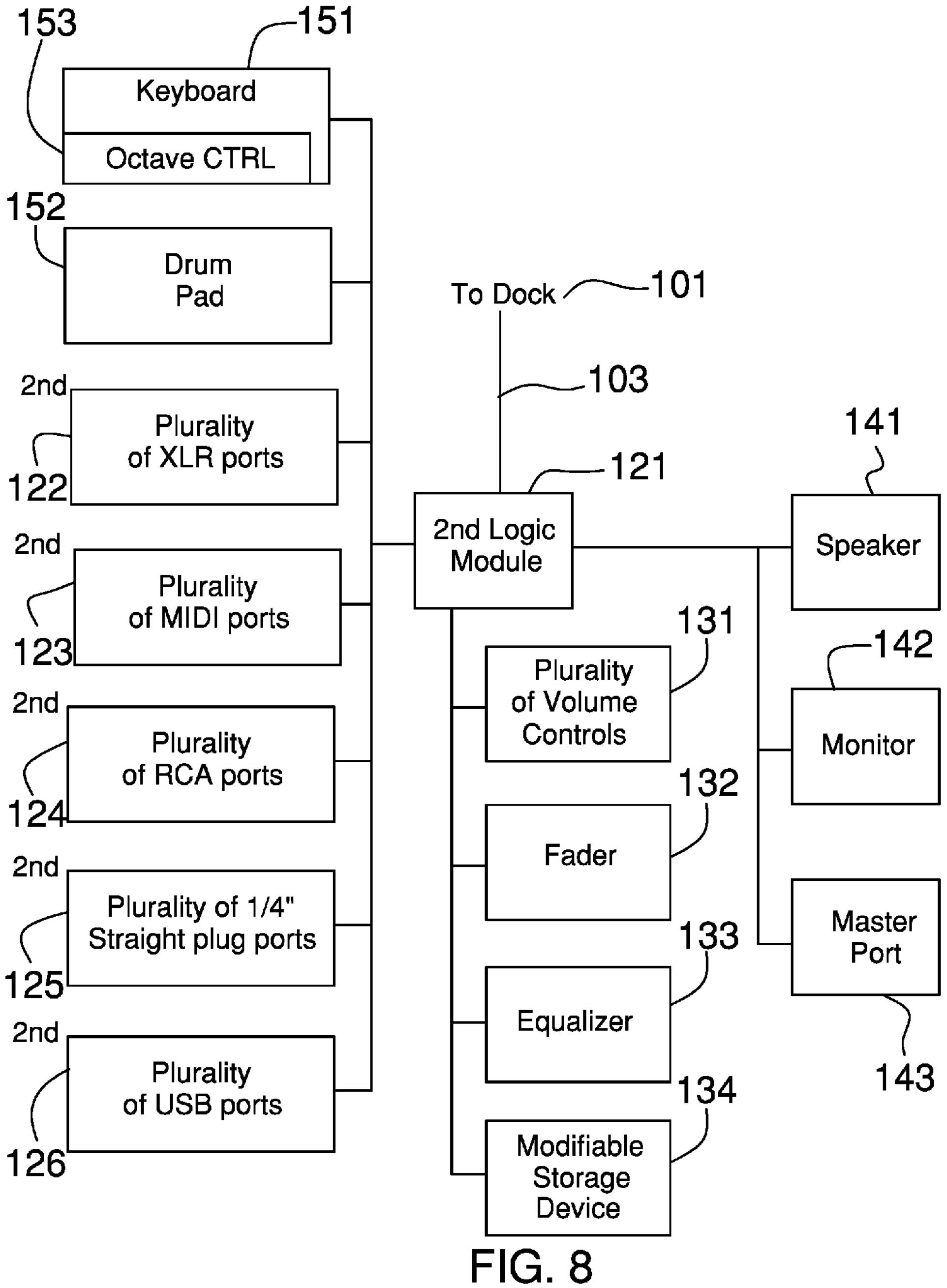
FIG. 8 is a block diagram of a detail of an embodiment of the disclosure.

Detailed reference will now be made to one or more potential embodiments of the disclosure, which are illustrated in FIGS. 1 through 8.

The portable music studio 100 (hereinafter invention) is configured for use with music and musical instruments. The invention 100 is a modular apparatus that records and mixes music in real time. The invention 100 comprises a dock 101 and a controller 102. The dock 101 is a switching device that: 1) receives a first set of one or more audio signals from a first set of one or more audio sources; 2) routes each of the received audio signals as a first multichannel audio signal to the controller 102; 3) receives an audio data stream from the controller 102; and 4) permanently records the received audio data stream to an electronic storage device.

The controller 102 is a device that: 1) receives a second set of one or more audio signals from a second set of one or more audio sources; 2) receives the first multichannel audio signal from the dock 101; 3) records each audio signal received through the second set of one or more audio signals as an independent audio file; 4) records each channel contained within the first multichannel audio signal as an independent audio file; 5) manipulates the volume of each of the recorded independent files; 6) manipulates the time index of any first recorded independent file relative to any second recorded independent file; 7) combines one or more recorded independent audio files into a single combined audio file; 8) transmits the single combined audio file to the dock 101 for permanent recordation; and, 9) transmits other individual audio files to the dock 101 for permanent recordation.

The invention 100 further provides the ability to generate musical audio input directly from the controller 102. The controller 102 is separable from the dock 101 such that the controller 102 can be used for recording, mixing and making audio files at a remote location. The invention 100 further comprises an umbilical cable 103. The umbilical cable 103 electrically connects the dock 101 to the controller 102. The umbilical cable 103 is an electrical cable that connects the dock 101 to the controller 102. Such electrical cables are well known and documented in the electrical arts and are readily and commercially available.

The dock 101 is an electronic device that is a component of the invention 100. The dock 101 is a switching device that receives audio signals from a plurality of sources and transmits the received audio signals to the controller 102. The dock 101 comprises a first housing 110, a first logic module 111, a first plurality of XLR ports 112, a first plurality of MIDI ports 113, a first plurality of RCA ports 114, a first plurality of straight plug ports 115, and a first plurality of USB ports 116.

The first housing 110 is a rigid casing within which the balance of the dock 101 is contained. The first logic module 111 is a programmable electronic device that is used to manage, regulate, and operate the dock 101.

Each of the first plurality of XLR ports 112 is an electrical port that is compatible with an XLR connector. Each of the first plurality of XLR ports 112 is used to electrically connect an instrument or electrical device that uses an XLR connector to the dock 101. The first logic module 111 receives an individual audio signal through each of the first plurality of XLR ports 112 and incorporates this individual audio signal into the first multichannel audio signal.

Each of the first plurality of MIDI ports 113 is an electrical port that is compatible with an MIDI connector. Each of the first plurality of MIDI ports 113 is used to electrically connect an instrument or electrical device that uses an MIDI connector to the dock 101. The first logic module 111 receives an individual audio signal through each of the plurality of first plurality of MIDI ports 113 and incorporates this individual audio signal into the first multichannel audio signal.

Each of the first plurality of RCA ports 114 is an electrical port that is compatible with an RCA connector. Each of the first plurality of RCA ports 114 is used to electrically connect an instrument or electrical device that uses an RCA connector to the dock 101. The first logic module 111 receives an individual audio signal through each of the first plurality of RCA ports 114 and incorporates this individual audio signal into the first multichannel audio signal.

Each of the first plurality of straight plug ports 115 is an electrical port that is configured to receive a ¼ inch straight plug. Each of the first plurality of straight plug ports 115 is used to electrically connect an instrument or electrical device that uses a ¼ inch straight plug connector to the dock 101. The first logic module 111 receives an individual audio signal through each of the first plurality of straight plug ports 115 and incorporates this individual audio signal into the first multichannel audio signal.

Each of the first plurality of USB ports 116 is an electrical port that is compatible with the USB standard. Each of the first plurality of USB ports 116 is used to electrically connect an instrument or electrical device that uses an USB connection to the dock 101. The first logic module 111 receives an individual audio signal through each of the first plurality of USB ports 116 and incorporates this individual audio signal into the first multichannel audio signal.

The dock 101 further comprises one or more storage devices 117 that are used by the controller 102 to permanently store audio files for archival and playback purposes. The one or more storage devices 117 are one or more electronic devices that are used for electronic data storage. The one or more storage devices 117 are used to provide archival storage of the audio files that are generated by the controller 102 and transmitted to the dock over the umbilical cable 103.

The controller 102 is an electronic device that is a component of the invention 100. The controller 102 receives a plurality of audio signals both from the dock 101 and from other audio sources. The controller 102 receives the first multichannel audio signal from the dock 101 directly over the umbilical cord 103. The controller 102 records and stores the signal received from each individual audio source selected from the plurality of audio sources in an individual audio file. The controller 102 is further used to modify the individual audio files and to combine two or more audio files. The combined audio files are subsequently stored in a separate and independent audio file. The controller 102 is a standalone device that can be carried by hand. The full functionality of the controller 102 remains available even when the controller 102 is electrically disconnected from the dock 101.

The controller 102 comprises a second housing 120, a second logic module 121, a second plurality of XLR ports 122, a second plurality of MIDI ports 123, a second plurality of RCA ports 124, a second plurality of straight plug ports 125, a second plurality of USB ports 126, a plurality of volume controls 131, a plurality of faders 132, an equalizer 133, a local modifiable data storage device 134, a speaker 141, and a master port 143.

The second housing 120 is a rigid casing within which the balance of the controller 102 is contained. The second logic module 121 is a programmable electronic device that is used to manage, regulate, and operate the controller 102.

Each of the second plurality of XLR ports 122 is an electrical port that is compatible with an XLR connector. Each of the second plurality of XLR ports 122 is used to electrically connect an instrument or electrical device that uses an XLR connector directly to the controller 102. The second logic module 121 receives an individual audio signal through each of the second plurality of XLR ports 122.

Each of the second plurality of MIDI ports 123 is an electrical port that is compatible with an MIDI connector. Each of the second plurality of MIDI ports 123 is used to electrically connect an instrument or electrical device that uses an MIDI connector directly to the controller 102. The second logic module 121 receives an individual audio signal through each of the second plurality of MIDI ports 123.

Each of the second plurality of RCA ports 124 is an electrical port that is compatible with an RCA connector. Each of the second plurality of RCA ports 124 is used to electrically connect an instrument or electrical device that uses an RCA connector directly to the controller 102. The second logic module 121 receives an individual audio signal through each of the second plurality of RCA ports 124.

Each of the second plurality of straight plug ports 125 is an electrical port that is configured to receive a ¼ inch straight plug. Each of the second plurality of straight plug ports 125 is used to electrically connect an instrument or electrical device that uses a ¼ inch straight plug connector directly to the controller 102. The second logic module 121 receives an individual audio signal through each of the second plurality of straight plug ports 125.

Each of the second plurality of USB ports 126 is an electrical port that is compatible with the USB standard. Each of the second plurality of USB ports 126 is used to electrically connect an instrument or electrical device that uses an USB connection directly to the controller 102. The second logic module 121 receives an individual audio signal through each of the second plurality of USB ports 126.

Each of the plurality of volume controls 131 is an electrical potentiometer that is used to control the output level, informally referred to as the volume, of: 1) a selected audio signal; or 2) an audio file. Each of the plurality of volume controls 131 is accessed by the user in the form of a dial.

Each of the plurality of faders 132 is an electrical potentiometer that is used to control the output level, informally referred to as the volume, of: 1) a selected audio signal; or 2) an audio file. Each of the plurality of faders 132 is accessed by the user in the form of a slider. Two faders are commonly used simultaneously to smoothly change audio files.

The equalizer 133 is an electronic device that is used to vary the relative output level, informally referred to as volume, of different frequencies within a given audio signal or audio file. The use of an equalizer 133 is well known and documented in the electrical, recording, and theater arts.

The local modifiable data storage device 134 is an electronic data storage device that is contained within the second housing 120 of the controller 102. The local modifiable data storage device 134 is used for the local storage of audio files on the controller 102. The speaker 141 is used to monitor the overall operation of the invention 100. For archival storage, the controller 102 is capable of sending one or more audio files stored on the local modifiable data storage device 134 to the dock 101 over the umbilical cable 103 such that the one or more audio files can be stored on the one or more storage devices 117.

The speaker 141 is a readily and commercially available speaker 141 that is mounted in the second housing 120 of the controller 102. The master port 143 is a ¼ inch straight port. The use of the master port 143 is reserved for the use of headphones, which are used to monitor the overall operation of the invention 100.

The controller 102 further comprises a musical keyboard 151 and a drum pad 152. The musical keyboard 151 is a standardized set of levers that are used to generate specific audible frequencies, which are used in making music. The musical keyboard 151 is a standard musical interface that is well known and commonly used by musicians. The musical keyboard 151 further comprises an octave control 153. The octave control 153 is a switching device that is used to change the frequency range of the tones generated by the musical keyboard 151. The drum pad 152 is a standard musical interface that is well known and commonly used by musicians in creating percussive rhythms for use in music.

In the second potential embodiment of the disclosure, the controller 102 further comprises a visual monitor 142. The visual monitor 142 is a visual interface that is managed by the controller 102. In the second potential embodiment of the disclosure, the visual monitor 142 is incorporated into a laptop computer which was modified to provide the above described functions and interfaces of the controller 102.

The following definitions were used in this disclosure:

¼ Inch Straight Plug Connection: As used in this disclosure, the ¼ inch straight plug connection is a well-known, standardized, and commonly used for the electrical interconnection musical instruments to amplifiers and recording devices.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted in to audible sounds by a speaker.

Cable: As used in this disclosure, a cable is a collection of insulated wires covered by a protective casing that is used for transmitting electricity or telecommunication signals.

Channel: As used in this disclosure, a channel refers to an individual audio signal selected from a plurality of audio signals.

Display: As used in this disclosure, a display is a surface upon which is projected an image, potentially including, but not limited to, graphic images and text, that is interpretable by an individual viewing the projected image in a meaningful manner.

Headphone: As used in this disclosure, a headphone is a device that comprises one or two earphones that are held to the ear, typically through the use of a band placed on top of the head. Headset is a synonym for headphone.

Interface: As used in this disclosure, an interface is a physical or virtual boundary that separates two different systems across which information is exchanged.

Logic Module: As used in this disclosure, a logic module is an electrical device that is programmable and that accepts digital and analog inputs, processes the digital and analog inputs according to previously stored instruction and provides the results of these instructions as digital or analog outputs.

MIDI: As used in this disclosure, MIDI is an acronym for musical instrument digital interface. The MIDI is a technical standard that defines an interface between an electronic musical interface and a computer or other digital processing device.

MIDI Connection: As used in this disclosure, a MIDI connection refers to an electrical connection formed by the combination of a plug and a port. The MIDI connection is defined by the MIDI technical standard. The MIDI connection is a round 5 pin connector. Only three of the five pins are used.

Plug: As used in this disclosure, a plug is an electrical termination that electrically connects a first electrical circuit to a second electrical circuit or a source of electricity. A plug is inserted into a matching port.

Port: As used in this disclosure, a port is an electrical termination that is used to connect a first electrical circuit to a second external electrical circuit. In this disclosure, the port is designed to receive a plug.

RCA Connection: As used in this disclosure, an RCA connection refers to an electrical connection formed by the combination of a plug and a port. The RCA connection is a well-known, standardized, and commonly used for the electrical interconnection of audio and visual components. An RCA connector is single prong circular connector that is commonly called a phono connector.

Speaker: As used in this disclosure, a speaker is an electrical device that converts an electrical signal into an audible sound.

XLR Connection: As used in this disclosure, an XLR connection refers to an electrical connection formed by the combination of a plug and a port. The XLR connection is a well-known, standardized, and commonly used for the electrical interconnection of audio and visual components. An XLR connector is a circular connector with between 3 and 7 pins.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable music studio comprising:

a dock, a controller, and an umbilical cable;

wherein the umbilical cable electrically connects the dock to the controller;

wherein the portable music studio is configured for use with music and musical instruments;

wherein the portable music studio is a modular apparatus that records and mixes music in real time;

wherein the controller is separable from the dock such that the controller can be used for recording, mixing and making audio files independently of the dock;

wherein the dock is a switching device that receives audio signals from a plurality of sources and transmits the received audio signals to the controller;

wherein the controller receives a plurality of audio signals both from the dock and from other audio sources;

wherein the controller records and stores the signal received from each individual audio source selected from the plurality of audio sources in an individual audio file;

wherein the controller is further used to modify the individual audio files and to combine two or more audio files;

wherein the dock is a switching device;

wherein the dock receives a first set of one or more audio signals from a first set of one or more audio sources;

wherein the dock routes each of the received audio signals as a first multichannel audio signal to the controller;

wherein the dock receives an audio data stream from the controller;

wherein the dock permanently records the received audio data stream to an electronic storage device;

wherein the controller is a programmable electronic device;

wherein the controller receives a second set of one or more audio signals from a second set of one or more audio sources;

wherein the controller receives the first multichannel audio signal from the dock;

wherein the controller records each audio signal received through the second set of one or more audio signals as an independent audio file;

wherein the controller records each channel contained within the first multichannel audio signal as an independent audio file;

wherein the controller manipulates the volume of each of the recorded independent files;

wherein the controller manipulates the time index of any first recorded independent file relative to any second recorded independent file;

wherein the controller combines one or more recorded independent audio files into a single combined audio file;

wherein the controller transmits the single combined audio file to the dock for permanent recordation;

wherein the controller transmits other individual audio files to the dock for permanent recordation;

wherein the portable music studio further provides the ability to generate musical audio input directly from the controller;

wherein the dock comprises a first housing, a first logic module, a first plurality of XLR ports, a first plurality of MIDI ports, a first plurality of RCA ports, a first plurality of straight plug ports, and a first plurality of USB ports;

wherein the first housing is a rigid casing within which the balance of the dock is contained;

wherein the first plurality of XLR ports, the first plurality of MIDI ports, the first plurality of RCA ports, the first plurality of straight plug ports, and the first plurality of USB ports are electrically connected to the first logic module;

wherein each of the first plurality of XLR ports is an electrical port that is compatible with an XLR connector;

wherein each of the first plurality of XLR ports is used to electrically connect an instrument or electrical device that uses an XLR connector to the dock;

wherein each of the first plurality of MIDI ports is an electrical port that is compatible with a MIDI connector;

wherein each of the first plurality of MIDI ports is used to electrically connect an instrument or electrical device that uses a MIDI connector to the dock;
wherein each of the first plurality of RCA ports is an electrical port that is compatible with an RCA connector;
wherein each of the first plurality of RCA ports is used to electrically connect an instrument or electrical device that uses an RCA connector to the dock;
wherein each of the first plurality of straight plug ports is an electrical port that is configured to receive a ¼ inch straight plug;
wherein each of the first plurality of straight plug ports is used to electrically connect an instrument or electrical device that uses a ¼ inch straight plug connector to the dock;
wherein each of the first plurality of USB ports is an electrical port that is compatible with the USB standard;
wherein each of the first plurality of USB ports is used to electrically connect an instrument or electrical device that uses an USB connection to the dock;
wherein the first logic module is a programmable electronic;
wherein the first logic module receives an individual audio signal through each of the first plurality of XLR ports and incorporates this individual audio signal into the first multichannel audio signal;
wherein the first logic module receives an individual audio signal through each of the plurality of first plurality of MIDI ports and incorporates this individual audio signal into the first multichannel audio signal;
wherein the first logic module receives an individual audio signal through each of the first plurality of RCA ports and incorporates this individual audio signal into the first multichannel audio signal;
wherein the first logic module receives an individual audio signal through each of the first plurality of straight plug ports and incorporates this individual audio signal into the first multichannel audio signal;
wherein the first logic module receives an individual audio signal through each of the first plurality of USB ports and incorporates this individual audio signal into the first multichannel audio signal;
wherein the dock further comprises one or more storage devices;
wherein the one or more storage devices are one or more electronic devices that are used for electronic data storage;
wherein the one or more storage devices are used to provide archival storage of the audio files that are generated by the controller and transmitted to the dock over the umbilical cable;
wherein the controller is an electronic device that is a component of the portable music studio;
wherein the controller receives a plurality of audio signals both from the dock and from other audio sources;
wherein the controller receives the first multichannel audio signal from the dock directly over the umbilical cord;
wherein the controller records and stores the signal received from each individual audio source selected from the plurality of audio sources in an individual audio file;
wherein the controller is further modifies the individual audio files;
wherein the controller combines two or more audio files;
wherein the combined audio files are stored in a separate and independent audio file;
wherein the controller is carried by hand;
wherein the full functionality of the controller remains available even when the controller is electrically disconnected from the dock.

2. The portable music studio according to claim 1
wherein the controller comprises a second housing, a second logic module, a second plurality of XLR ports, a second plurality of MIDI ports, a second plurality of RCA ports, a second plurality of straight plug ports, a second plurality of USB ports, a plurality of volume controls, a plurality of faders, an equalizer, a local modifiable data storage device, a speaker, and a master port;
wherein the second housing is a rigid casing within which the balance of the controller is contained;
wherein the second plurality of XLR ports, the second plurality of MIDI ports, the second plurality of RCA ports, the second plurality of straight plug ports, the second plurality of USB ports, the plurality of volume controls, the plurality of faders, the equalizer, the local modifiable data storage device, the speaker, and the master port are electrically connected to the second logic module;
wherein the local modifiable data storage device is an electronic data storage device that is contained within the second housing of the controller.

3. The portable music studio according to claim 2
wherein each of the second plurality of XLR ports is an electrical port that is compatible with an XLR connector;
wherein each of the second plurality of XLR ports is used to electrically connect an instrument or electrical device that uses an XLR connector directly to the controller;
wherein each of the second plurality of MIDI ports is an electrical port that is compatible with a MIDI connector;
wherein each of the second plurality of MIDI ports is used to electrically connect an instrument or electrical device that uses a MIDI connector directly to the controller;
wherein each of the second plurality of RCA ports is an electrical port that is compatible with an RCA connector;
wherein each of the second plurality of RCA ports is used to electrically connect an instrument or electrical device that uses an RCA connector directly to the controller;
wherein each of the second plurality of straight plug ports is an electrical port that is configured to receive a ¼ inch straight plug;
wherein each of the second plurality of straight plug ports is used to electrically connect an instrument or electrical device that uses a ¼ inch straight plug connector directly to the controller;
wherein each of the second plurality of USB ports is an electrical port that is compatible with the USB standard;
wherein each of the second plurality of USB ports is used to electrically connect an instrument or electrical device that uses an USB connection directly to the controller.

4. The portable music studio according to claim 3
wherein the second logic module is a programmable electronic device;

wherein the second logic module receives an individual audio signal through each of the second plurality of XLR ports;

wherein the second logic module receives an individual audio signal through each of the second plurality of MIDI ports;

wherein the second logic module receives an individual audio signal through each of the second plurality of RCA ports;

wherein the second logic module receives an individual audio signal through each of the second plurality of straight plug ports;

wherein the second logic module receives an individual audio signal through each of the second plurality of USB ports.

5. The portable music studio according to claim 4 wherein each of the plurality of volume controls is an electrical potentiometer that controls the output level of an object selected from the group consisting of a selected audio signal or an audio file;

wherein each of the plurality of volume controls is accessed in the form of a dial.

6. The portable music studio according to claim 5 wherein each of the plurality of faders is an electrical potentiometer that controls the output level of an object selected from the group consisting of a selected audio signal or an audio file;

wherein each of the plurality of faders is accessed in the form of a slider.

7. The portable music studio according to claim 6 wherein the equalizer is an electronic device that is used to vary the relative output level of different frequencies within an object selected from the group consisting of a selected audio signal or an audio file.

8. The portable music studio according to claim 7 wherein the speaker is mounted in the second housing of the controller such that acoustic energy generated by the speaker is audible;

wherein the master port is a inch straight port.

9. The portable music studio according to claim 8 wherein the controller further comprises a musical keyboard and a drum pad;

wherein the musical keyboard is a standardized set of levers that are used to generate specific audible frequencies which are used in making music;

wherein the drum pad is a standard musical interface that is well known and commonly used by musicians in creating percussive rhythms for use in music;

wherein the musical keyboard further comprises an octave control;

wherein the octave control is a switching device that is used to change the frequency range of the tones generated by the musical keyboard.

10. The portable music studio according to claim 9 wherein the controller further comprises a visual monitor.

* * * * *